Patented June 26, 1934

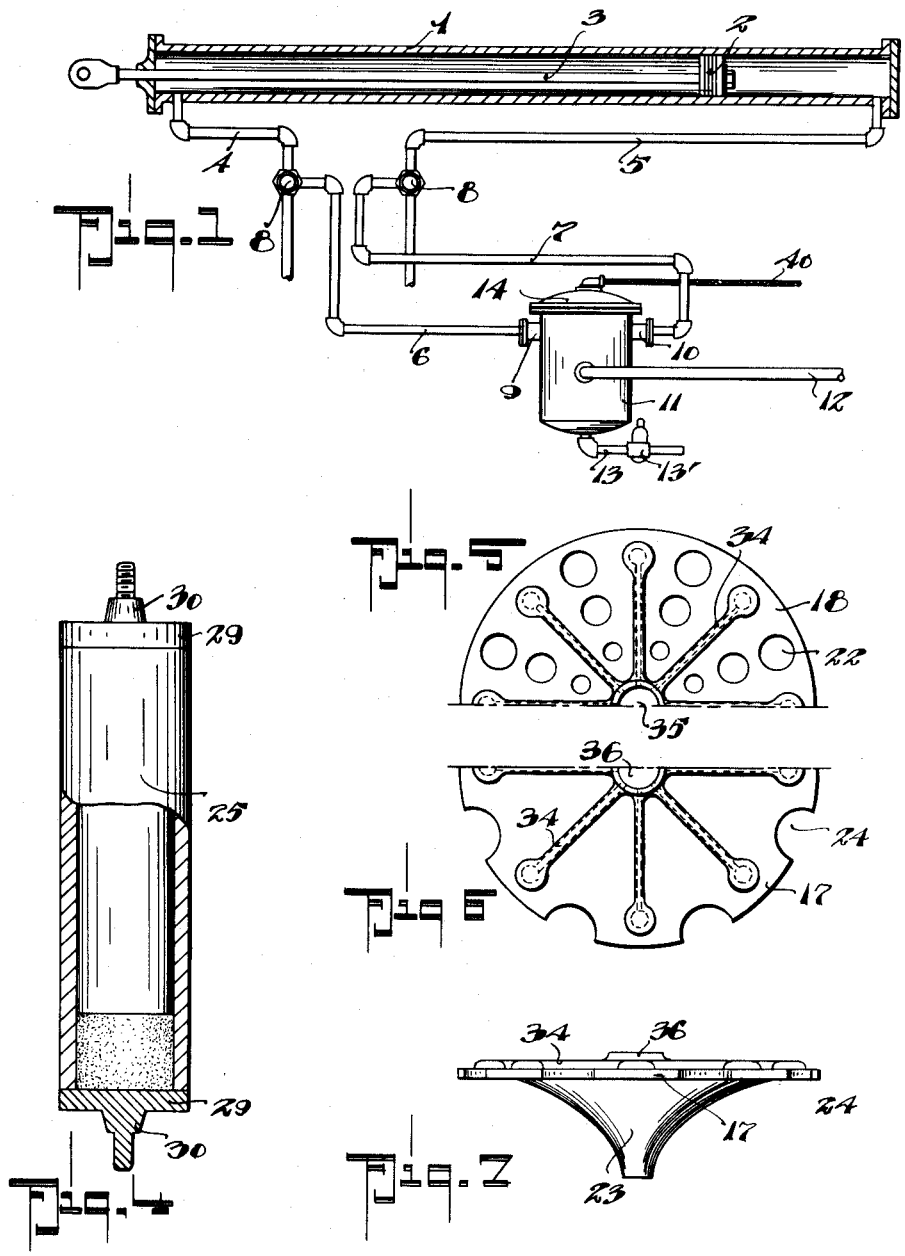

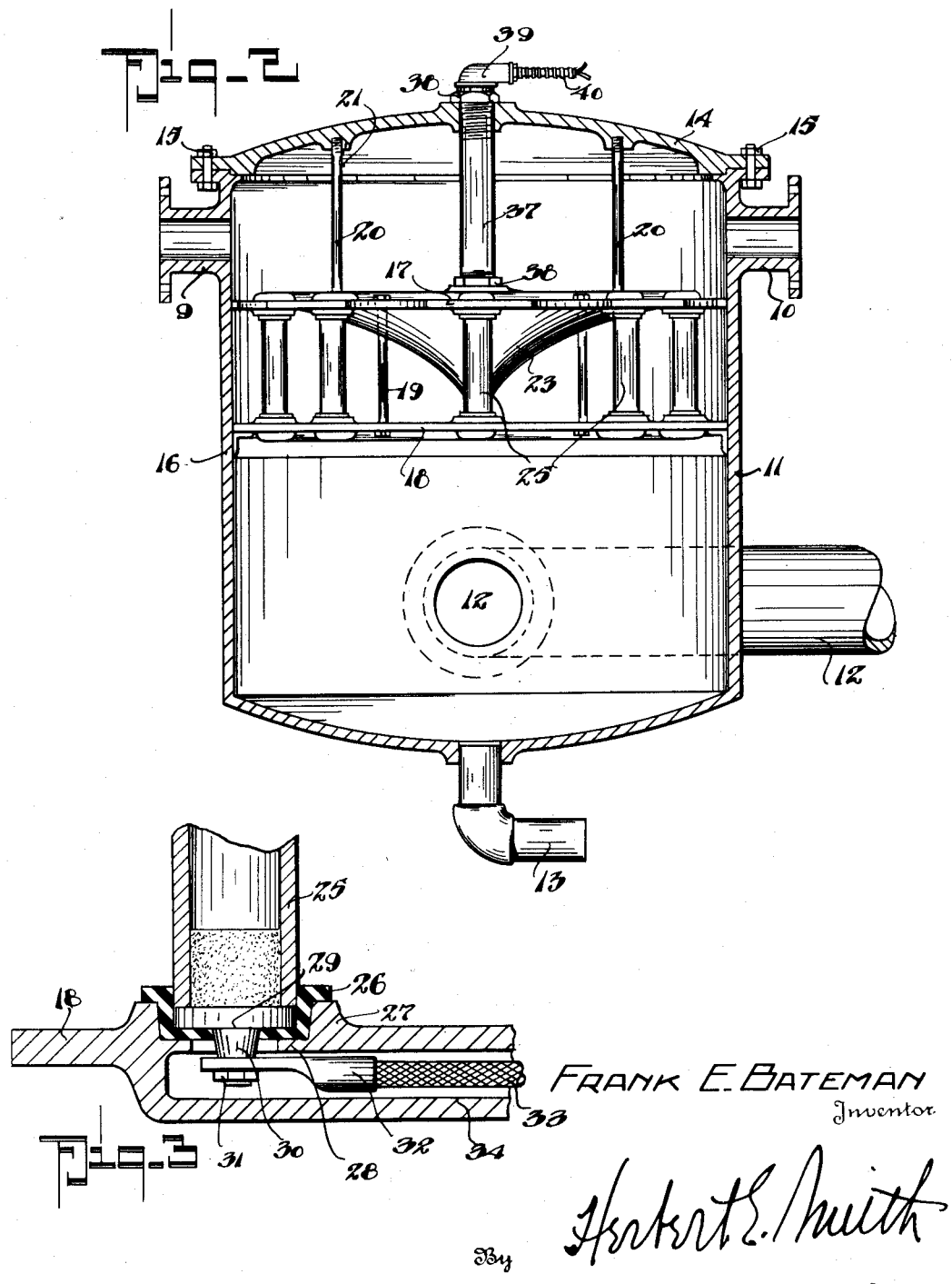

1,964,396

UNITED STATES PATENT OFFICE 1,964,396

ELECTRIC HEATING APPLIANCE

Frank E. Bateman, Libby, Mont.

Application August 28, 1933, Serial No. 687,088

4 Claims. (Cl. 219—39)

My present invention relates to improvements in electric heating appliances especially designed for superheating or re-heating steam. In numerous industries where steam is employed for power and heating purposes, as for instance in a sawmill and in a lumber drying kiln, the boiler for generating the steam is located at a distance from the point where the power is applied or the heat utilized. The steam thus generated is conveyed through pipes to the point of use, and in many instances the steam loses its efficiency before it can be utilized, or unusual and expensive precautions must be made to insure the delivery of the steam at its proper temperature to the point of use. While the electric heating appliance of my invention is adapted for various uses, it is especially designed for use in saw mills where the reciprocating carriage is operated from a steam motor (or "shotgun") involving the use of a steam cylinder and its reciprocating piston or plunger. The steam for operating the carriage motor is generated in the distant boiler and conveyed to the saw mill in pipes, and the heater of my invention is interposed between the steam supply pipes and the feed pipes of the cylinder for the purpose of re-heating or superheating the steam before it enters the cylinder of the steam motor of the saw mill, or its carriage.

The invention involves the use of a heating cylinder or vessel through which the steam is passed, and within the cylinder a removable, electric heating-unit is suspended and supported. Means are provided whereby the steam is uniformly distributed throughout the interior of the heating cylinder and subjected to the high temperature created within the heating cylinder by the heating unit, and the heating unit is constructed and arranged in such manner as to insure a maximum and equal distribution of the heat in order that the steam passing through the heater may quickly be re-heated or superheated to the desired degree.

The invention consists in certain novel combinations and arrangements of parts as will hereinafter be more fully set forth and claimed. In the accompanying drawings I have illustrated one complete example of the physical embodiment of my invention adapted for use with the steam motor of a reciprocating sawmill carriage, and in which the parts are combined and arranged in accord with the best mode I have thus far devised for the practical application of the principles of my invention. It will be understood, however, that the exemplified structure may be changed and altered within the scope of my claims, without departing from the principles of my invention.

Figure 1 is a view partly in section showing the heater of my invention in use with the steam motor before referred to. Figure 2 is an enlarged, vertical sectional view of the heater. Figure 3 is an enlarged detail sectional view showing the manner of joining an electric heating element with one of the heater plates.

Figure 4 is a detail view partly in section of one of the electric heating elements. Figure 5 is a plan view showing one-half of the lower heating plate, and Figure 6 is a similar view showing one half of the upper heater-plate. Figure 7 is a side view or elevation of the upper heater-plate.

In order that the general arrangement and utility of the parts may readily be understood I have shown in Figure 1 a steam cylinder 1 having the reciprocating piston or plunger 2 and its rod 3, the latter being connected in suitable manner to the carriage (not shown) of a saw mill. Steam, for power is supplied to the opposite ends of the cylinder through feed pipes 4 and 5 and these pipes are supplied with steam from the supply pipes 6 and 7, suitable control valves 8, 8, being employed for usual purposes.

The supply pipes 6 and 7 are connected directly to outlet ports 9 and 10 of the steam-heater, which includes a cylinder 11, and the cylinder is supplied with steam from the boiler at a remote distance through the inlet pipe 12. Thus the steam from the boiler enters the lower portion of the heating cylinder and is re-heated or superheated in the heater, and then passes out from the upper portion of the heater through the supply pipes 6 and 7 to the feed pipes 4 and 5 of the motor cylinder 1. A drain pipe 13 and its trap 13' are provided at the lower end or bottom of the cylinder 11 for the performance of their usual functions.

Within the heater cylinder is supported and suspended an electric heating unit, and the cylinder is provided with a domeshaped cover 14 that is detachably fastened, by means of bolts 15 and the usual flanges, to the upper open end of the cylinder 11. Within the interior of the cylinder and located approximately mid-way its height a supporting ring 16 is attached to the wall of the cylinder, and this ring, of angle iron, affords a support for the removable, electric heating unit.

The heating unit, as illustrated, is a substantially open frame that includes an upper, circular, flat plate or disk 17 and a lower circular flat plate or disk 18, both disposed horizontally in the heater cylinder and spaced vertically.

The vertically spaced heater plates, which fit neatly within the interior of the cylinder, are rigidly joined by a number of tie-bolts 19, and these plates are suspended from the cover 14 by means of suspending bolts 20 fastened to the upper plate 17 and threaded at 21 in suitable bosses on the inner face of the cover 14. Thus, it will be apparent the heating unit may be withdrawn from the cylinder, for inspection, repairs, etc., when the bolts 15 are removed and the cover 14 is removed, the heating unit of course being withdrawn as the cover is removed. So also the heating unit is inserted in the open top of the cylinder as the cover is placed on the cylinder, and by means of the suspending bolts and the supporting ring 16 the heating unit is retained in its proper place in the cylinder of the heater.

As indicated in Figure 2, the heating unit forms in the cylinder 11 a lower inlet chamber, an upper outlet chamber, and the two vertically spaced plates, between them, form an intermediate heating chamber, for the steam entering through the pipe 12. The outlet chamber forms a dome for the re-heated or superheated steam and this steam passes out through the ports 9 and 10 as described.

As seen in Figure 5, the lower plate 18 is perforated to permit steam to rise from the inlet chamber to the heating chamber, and the holes 22 are arranged over substantially the entire area of the plate in order that the steam may enter the lower portion of the heating chamber and be distributed throughout the entire area of the heating chamber.

The upper plate, on its underside is provided with a hollow, downwardly tapering, central boss, or inverted cone 23, and the upwardly flaring face of this boss forms a deflector which deflects the rising steam outwardly toward the periphery of the plate toward a series of peripheral notches or ports 24 in the circular edge of the upper plate, through which notches the heated steam rises into the dome in the upper portion of the cylinder.

By means of the deflector the steam is directed into contact with an annular series of electric heating elements designated as a whole by the numeral 25, and the heating elements are clamped in upright position between the upper and the lower plates of the heater adjacent to the peripheries of the plates, and of course near the cylindrical wall of the heater. At the upper end and at the lower end of each heating element an insulating gasket 26, of asbestos or other suitable material, is employed, and seated in a socket 27 of the respective plates 17 and 18, and the base 28 of the socket forms an annular flange as indicated in Figure 3. The ends 29 of the heating elements are seated in the gaskets, and each end or head 29 has a threaded pin 30 thereon projecting through the socket and provided with a nut 31 by means of which the terminal 32 of an electric wire 33 is secured to the pin or post 30. These wires 33 are enclosed within a series of ducts 34, in each plate, which ducts radiate from the center opening 35 of the lower plate and from the center opening or seat 36 of the upper plate, as best seen in Figures 5 and 6, toward the periphery of the respective plates.

The wires or conductors 33 of the lower plate are gathered at the central seat or hole 35 of the lower plate, and this seat receives the lower end of the hollow tapering deflector 23 of the upper plate. The wires then pass upwardly through the hollow deflector, through the central seat 36 of the upper plate and thence through a tube 37 that is seated at its lower end in the seat 36 of the upper plate 17. This central tube is located in the dome of the heater and its upper end is threaded in a central opening of the cover 14. Nuts 38, 38 are employed to fasten the threaded ends of the tube to the upper plate and to the cover of the heater, and a cap or closure 39, exterior of the cover, forms an outlet for the cable or bunch of wires indicated as 40. Thus the electric wires are housed or protected within the ducts of the plates, within the hollow deflector, and within the housing or central tube 37 of the dome, and suitable means are employed for securing steam tight joints in these connected parts.

The heating elements 25 may be employed in suitable numbers, and clamped between the plates, and the conductors 29—30, preferably of copper, at the ends of the elements, are insulated as illustrated in Figure 3. The elements are fashioned of durable material that will produce an intense heat for the purpose of superheating or re-heating the steam as it flows through the heating chamber. For this purpose I find that heating elements made up of carborundum, carbon, and graphite, principally, form a very acceptable heating element.

The heating cylinder it will be understood, may be fashioned in suitable sizes for different installations and for different uses, and the heating unit likewise is varied in size and capacity for the different uses to which it is applied. For use with lumber drying kilns, the heating appliance is highly successful in providing dry steam for the kiln, and for power appliances or motors, machines, etc., the heater of my invention is efficient in the application of an intense heat to the steam for the purpose of re-heating the steam or for superheating the steam to a desired degree.

Having thus fully described my invention, what I claim as new and desire to secure by Letters Patent is:

1. The combination in an electric steam-heater, of a heating unit comprising a pair of vertically spaced plates forming an inlet chamber the lower plate having ports therethrough and the upper plate having peripheral ports, an outlet chamber and an intermediate heating chamber, tie bolts between said plates, electric heating elements clamped between said plates, and a central deflector mounted between said plates flaring outwardly toward said peripheral ports.

2. The combination in an electric steam-heater, of a heating unit comprising a pair of vertically spaced plates forming an inlet chamber, an outlet chamber and an intermediate heating chamber, tie bolts uniting said spaced plates, an annular series of heating elements mounted between said plates adjacent the outer periphery of the plates, the lower of said plates having ports therethrough and the upper plate having ports at its periphery, and an inverted-cone-shaped deflector mounted on the underside of the upper plate for directing steam toward said ports of the upper plate.

3. The combination in a heater as described, with a heating vessel, of a removable cover and fastening means for the cover, a heating unit suspended from said cover and comprising a pair of vertically spaced plates forming an inlet chamber, an outlet chamber, and an intermediate heating chamber, an annular series of heating elements mounted between said plates adjacent the outer periphery thereof, the lower plate being ported and the upper plate having ports at its periphery, and an inverted cone-shaped deflector mounted in the heating chamber for directing steam toward the peripheral ports.

4. In an electrical steam heater, the combination with a cylinder of a heating unit comprising spaced plates having radial ducts therein and an annular series of heating elements mounted between said plates at the terminals of complementary ducts, a central conductor-tube mounted at the top of the upper plate, a hollow deflector of inverted cone shape mounted between said plates and forming a housing for electrical conductors to the ducts of the lower plate, and said plates having ports therein.

FRANK E. BATEMAN.